Jan. 28, 1969    J. E. VANDERBUR, JR., ETAL    3,424,218
MEDICAL MATERIAL CONTAINER
Filed Dec. 7, 1966

INVENTORS.
JOHN E. VANDERBUR, JR.
JAMES N. WAGGONER
ROBERT M. MCBRIEN
BY
Orville R. Seidner
AGENT United States Patent Office
3,424,218
Patented Jan. 28, 1969

3,424,218
MEDICAL MATERIAL CONTAINER
John E. Vanderbur, Jr., and James N. Waggoner, Los Angeles, and Robert M. McBrien, Manhattan Beach, Calif., assignors to The Garrett Corporation, Los Angeles, Calif., a corporation of California
Filed Dec. 7, 1966, Ser. No. 599,947
U.S. Cl. 150—.5    7 Claims
Int. Cl. B65d 35/08, 41/20

ABSTRACT OF THE DISCLOSURE

A thin-walled container fabricated from a silicone eltastomer material has a silicone elastomer closure member removably secured thereto at a reduced neck portion of the container by a reinforcing band removably disposed thereabout. The closure may comprise a reinforcing ring to prevent collapsation when the band is applied.

---

This invention relates generally to the container art, and is directed particularly to the class of containers utilized in the life sciences and medical arts for the loading, storage, transportation and on-site utilization or infusion of medical materials.

As is known in the medical rat, containers for materials intended for infusion, for example, have to meet certain strict requirements related to the physical, chamical, biological, physiological and bio-physiological integrity of the contained materials. Of principal concern is that of obtaining a substantially hermetic seal by the container against the undesirable entry of deleterious, unwanted contaminants. Coincidental with this concern is the requirement that the interior wall of the container shall maintain substantially its own integrity and not impart to the contents any material or substance from the container wall, either by reactivity with or dissolution into the contents, and which might be foreign and inimical to the human body.

Heretofore it has been customary to fabricate containers of this type from glass or metal. Glass containers are relatively inexpensive to fabricate and have been considered largely as expendable. Metal containers, on the other hand, are somewhat more expensive and have found use principally in such situations where it is possible to re-use them. This latter factor does not lend itself beneficially to cases where the filling sites and sites of uses or infusions are separated by long distances.

A brief mention might be made here of proposals to fabricate containers from certain plastics, but these proposals have not met with much acceptance primarily because (1) such plastic containers are relatively expensive for "one time use," or (2) they do not have the requisite shatterproof characteristic, or (3) they are not inert to body fluids, or (4) they do not stand upo to autoclaving temperatures and pressures.

It should be noted that the most satisfactory container material to date has been glass, and a careful observer will note that the medical art practically "grew up" with this acceptance without considering that containers of materials having physical properties differing from glass might be more useful. One of the properties of glass which has come to be commonly accepted as a requirement is the physical property of fixed form rigidity. Glass is a rigid material, hence glass containers are rigid. Therefore containers for medical materials have to be rigid, a priori. Rigidity was thought (if any thought was given to it) to be desirable from the standpoint of self supporting sufficiency of the container and contents. In other words, if a glass container and contents is placed on a table, for example, it will stand upright without collapsing.

Contrary to all accepted thinking as to the needed requirements by medical practioners, it has been conceived in accordance with the present invention that the idea of total container rigidity is false, and that the container might better be fabricated of materials which have little self supporting resiliency and thereby are almost completely collapsible upon the application of small external pressures or forces. Once the idea of any necessity for a rigid container is discarded, many advantages are apparent for the case of a non-rigid container.

One of the foremost of the advantages, of course, is that it is substantially shotterproof and unbreakable. Now it is apparent from this one characteristic that additional advantages arise, one of which is a neat solution to the shipping problem both for empty and filled containers. In the case of glass containers, elaborate cautions must be taken in the packaging for shipment to reduce the incidence of breakage. For example, a glass container must be fabricated with a relatively thick wall in order to reduce to a minimum the incidence of breakage. This means greater weight in the finished product, and since breakage is a major factor to be considered in shipping the resulting shipping package will occupy up to twice the volume of the package contents. In the case of containers according to the present invention, a bare minimum of attention need be given to the shipping problem.

Accordingly, it is the general object of the present invention to provide a substantially unbreakable container for medical use.

Considering now briefly another essential requirement of containers for medical use, attention is directed to sterilization procedures for the containers and their contents. Sterilization is usually accomplished by autoclaving, and in the case of medical containers without fluid contents, the procedure is to autoclave for twenty minutes or more at a temperature of about 250–260° F. When the container has fluid contents, the time of autoclaving is usually of the order of 60 minutes or more. It is an object of the invention to provide a container for medical use which is not only autoclavable for 60 minutes at 250–260° F., but is repeatedly so since, as will be pointed out below, the container of this invention has extended utility for repeated use which is not disadvantaged by the shortcomings of the containers of the prior art, i.e. those likewise intended to be reused.

Reverting to the integrity of the container material, discussed hereinabove, it should be noted that no material is going to be proof against possible minute contamination of the container contents. Glass has been considered in the past to be one of the best materials obtainable. Yet, it will be recalled that the human body rejects glass particles, violently in some cases. Hence the possibility of small particles breaking off in the interior of glass containers is always an unforseeable hazard. On the other hand, the present invention discloses a container fabricated from a silicone elastomer, such as the type utilized for implants within the human body. Furthermore, this silicone elastomer material is considered to have a high level of body fluid compatibility required for this type of device. Accordingly, it is an object of this invention to provide a medical material container fabricated from a silicone elastomer.

It is a further object of the invention to provide a container as aforesaid, comprised of a thin walled container body open at one end and a closure means removably secured across the open end of the body, the closure means having a membrane portion adapted to repeated perforation by a cannula or needle for the injection into the container and removal therefrom of fluids. In a preferred embodiment, the open end of the container body is generally reduced to a necked configuration having a portion thereof arranged to engage retentively a peripheral portion of the closure means. Preferably, the closure means is likewise fabricated from a silicone elastomer. A reinforcing band may be disposed about the neck portion of the preferred embodiment to impart a degree of hoop strength rigidity to the neck portion and to prevent separation of the closure means from the neck portion.

It is another object of the invention to provide a medical material container of the type mentioned above, the container being encased in a protective enclosure comprised of an open mesh or net bag, preferably fabricated from one of the synthetic monofilaments such as Dacron which will withstand autoclaving temperatures without deterioration. The open mesh or net feature is desirable in order to be able to observe the contents of the container. Preferably, also, the bag is provided with a drawstring closure at its open end adjacent the closure means of the container in order to facilitate removal and replacement of the closure means as desired or necessary.

The protective enclosure is an important consideration for a medical material container which is to be autoclaved with fluid contents. As is well known, autoclaving is accomplished by steam under pressure. As the pressure builds up at a moderate rate, there is a tendency for equalization of the pressure inside the container. If, then, the external pressure is suddenly relieved upon the termination of autoclaving, there is the possibility of explosion or bursting of the container from the unrelieved internal pressure. The net or mesh bag concept of the present invention reduces this bursting potential to a negligible possibility.

As aforesaid, a container according to the present invention is fabricated from a silicone elastomer. Preferably the container has a wall thickness no greater than is essential from a design standpoint, and in an embodiment of a container of one liter capacity, a wall thickness of the order of .060 inch has been found feasible. It is recognized of course, that a container of silicone elastomer having a wall thickness of the aforesaid amount has very little self supporting resiliency or rigidity; nevertheless when it is empty it has a slight resilient tendency to assume its fabricated shape when held by the neck portion. In such a case a definite advantage is had in that no bubbler is necessary to withdraw, by gravity, the contents of the container at the cite of an infusion. The container collapses from the small differential force of atmospheric pressure exerted on the exterior wall surface as the contents are withdrawn.

An added feature of the container, fabricated from a silicone elastomer according to the present invention, is its resusability. As noted, the elastomer material stands up well with repeated autoclaving at elevated temperatures without deterioration, embrittlement, or flaking. Due to the collapsible nature and unbreakability of the container, it is easily packed and transported from the point of use back to a filling point. On the other hand, it may be refilled near the point of use from a bulk supply and autoclaved just prior to reuse.

Other advantages and objects will be apparent to those skilled in the art from the following description when considered with the accompanying drawing which discloses preferred embodiments without intent to limit the invention thereto. In the drawing.

Figure 1:
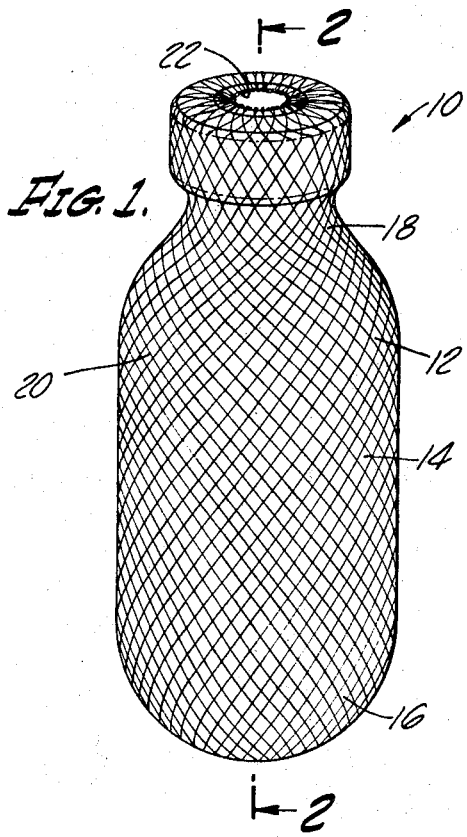
FIG. 1 is an upright perspective view of a preferred embodiment of the invention.

Referring to FIG. 1, the medical material container 10 is shown as comprising a body portion 12 having a generally cylindrical portion 14, a rounded bottom portion 16, and a neck portion 18 of reduced section. The reduced neck portion is somewhat enlarged at the end in order to accommodate the closure means described below. An open mesh or net bag 20 encloses the container 10, the bag 20 being provided at its open end 22 with a drawstring (not shown), the ends of which may be tucked in the opening.

Figure 2:
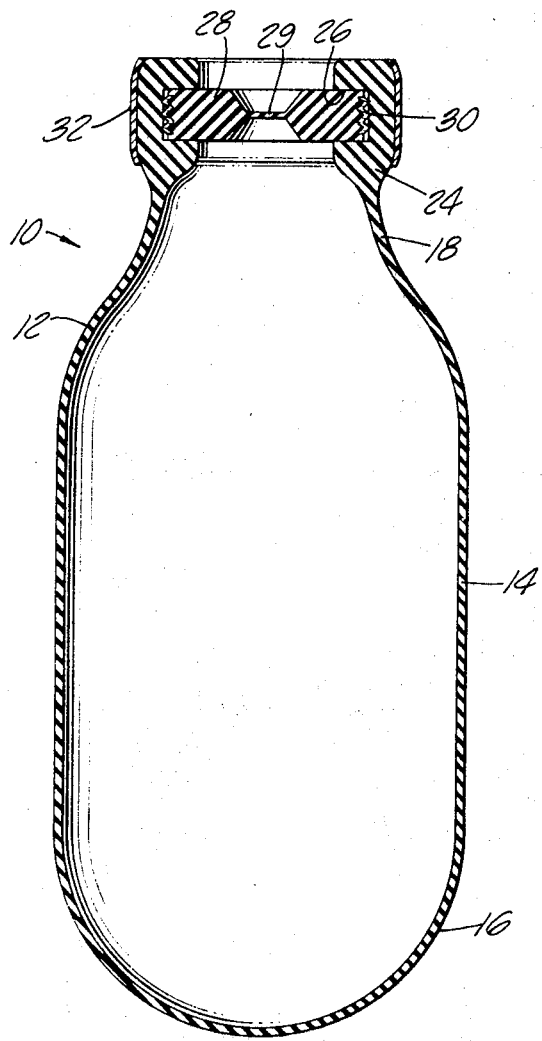
FIG. 2 is an enlarged cross-sectional view taken on line 2—2 of FIG. 1, the net bag removed for clarity.

As will be seen in FIG. 2, the body portion 12 is of substantially thin walled construction which is thickened and enlarged somewhat at the end 24, the neck portion 18 merging with the end 24 to form a unitary structure which is fabricated preferably from a silicone elastomer. The end 24 is arranged to define a groove 26 adapted to accommodate a closure means 28. Preferably, the groove 26 is annular, as is the closure 28 which has a reduced central portion 29 constituting a thin membrane adapted for the insertion of a cannula (not shown).

The closure means 28 is likewise preferably fabricated from a silicone elastomer, and is provided with a reinforcing ring 30 molded therein when the closure 28 is formed by well known molding techniques. The ring 30 may be metal or a fairly rigid plastic material capable of withstanding nominal compressive hoop stresses when a reinforcing band means 32 is disposed about the outer periphery of the container end 24. The band 32 may be of any preferred material which exerts a nominal radial compressive stress against the outer periphery of the end 24 and is resistant to radial displacement of the end 24 upon the occasion of pressure build up within the container 10 during autoclaving procedures. Of necessity, the band 32 must be removable and replacable upon the event of replacement of the closure means 28. Likewise, the band 32 must withstand the autoclaving temperature of 250–260° F. without deterioration, particularly so when the container 10 is reused repeatedly as is contemplated. Accordingly, the band 32 may be fabricated of nonstretchable material and formed with an interference fit so that it can be forced over the outer periphery of the end 24 by hand manipulation, for example.

An alternative material for the band 32 is a heat shrinkable plastic tubing, such as an irradiated polyolefin. Yet another material is a resilent stretchable material such as a silicone or rubber band. In any event, the particular band material selected is of little consequence beyond design considerations, since the contents of the container 10 never come into contact with the band. The same thing can be said of the reinforcing ring 30 in the closure means 28.

It will be noted that when the band 32 is applied, radial compressive stresses are imparted to the end 24 which results in effective sealing between the internal faces of the groove 26 and the faying surfaces of the closure means 28. As shown in FIG. 2, the ring 30 is configured preferably with a corrugated or saw-tooth section, which configuration impacts strength to it against radial bending stresses. More importantly, the tips of the corrugations or teeth are presented to the internal circumferential surface of the groove 26 in the end 24 of the container. Hence when the band 32 is disposed about the end 24, centrally directed radial forces are imparted to the end 24 which results in high unit loading of the groove surface at the tips of the corrugations or teeth. This high unit loading greatly enhances the seal against pressure inside the container.

Figure 4:
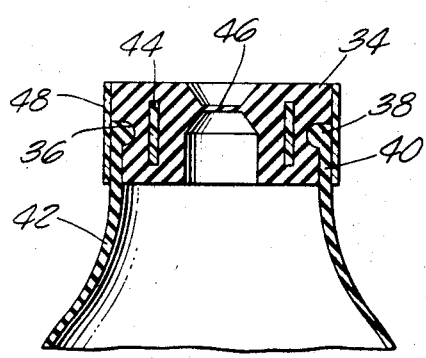
FIG. 4 is a fragmentary cross-sectional view of an alternative embodiment of a closure means and corresponding container neck.

Referring to FIG. 4, there is shown an alternative embodiment of a closure means 34. In this embodiment the closure 34 is provided with a peripheral groove 36 adapted to receive the inwardly directed lip or bead 38 formed on the end 40 of the neck 42 of the container. A reinforcing ring 44 is molded in the closure 34 which is provided adjacent its central portion with the reduced section membrane 46. Disposed about the outer periphery of a portion of the closure means 34 and an upper portion of the neck end 40 is a reinforcing band 48 serving to maintain the container and closure in sealing relationship against the entry of contaminants into the container or loss of contents therefrom, similar to the case of the embodiment of FIG. 2. Effectively, what is accomplished by the provision of the reinforcing bands 32 and 48 of the two embodiments is to rigidify to some extent the upper end of the container in a secure assembly.

Figure 3:
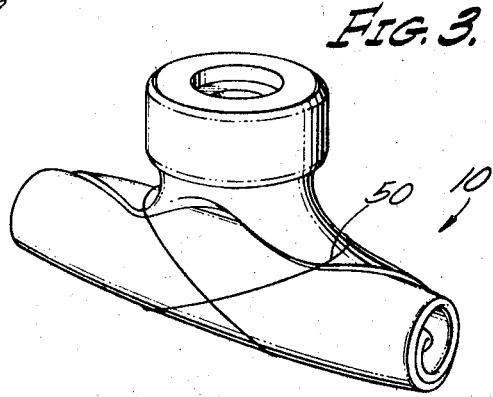
FIG. 3 is an illustrative perspective view of the container of FIG. 1 with the bag removed, rolled up and secured for placement in the shipping container.

As noted hereinabove, the collapsible container of the present invention is favorably adapted to a minimum consideration of the problem of shipping, either empty or filled. The container is readily adaptable to having salts or other dehydrated or desiccated materials, intended for infusion, placed in the container at one site, the container and dry contents then being shipped to a site of use whereat pyrogen-free water may be added to dissolve the dry contents just prior to infusion. In FIG. 3, the container 10 (without the enclosing mesh or net bag 20 of FIG. 1) is shown as rolled up and secured with a sizing 50 which may be a cord of Dacron, for example, or a rubber band. The container may or may not contain the dry materials alluded to above. In any event; it is at once apparent that the collapsible container of the present invention provides many advantages over those of the prior art, not the least of which are those of handling and shipping.

As a final observation on the physical properties of the container material of the present invention, it will be noted that silicone elastomer has an excellent resilient "memory" property for the membrane defined by the closure means. Thus, when a cannula or needle is inserted through the membrane the resulting hole is much smaller than the section of the cannula. And when the cannula is withdrawn the material around the hole contracts to the extent possible to almost completely reseal the hole and renew the hermetic integrity of the membrane.

We claim:
1. A substantially unbreakable container for medical use, said container being adapted for repeated autoclaving at elevated sterilizing temperatures, said container comprising:
   (a) a thin-walled container body open at one end, the material of which said body is comprised being substantially inert to human body fluids and having very little self-supporting resiliency and thereby being substantially completely collapsible upon the application of small external pressures;
   (b) closure means removably secured across said open end of said body, said closure means having a membrane portion adapted to repeated perforation by a cannula for fluid injection into and withdrawal from said container, said membrane portion having sufficient inherent resiliency to reseal the opening of the perforation upon removal of the cannula, the material of said closure means being substantially inert to human body fluids, said container body being of generally cylindrical configuration, the open end thereof being generally reduced to a necked configuration having a portion thereof arranged to engage retentively a peripheral portion of said closure means; and
   (c) reinforcing band means removably disposed about said neck portion to impart a degree of rigidity thereto.

2. The container of claim 1 in which said reinforcing band means is removably disposed about said neck portion so as to prevent separation of said closure means from said container.

3. The container of claim 2 in which said closure means is provided with a reinforcing ring means molded therein to prevent collapsation of said closure means upon application of said reinforcing band means about said neck portion of said container body.

4. The container of claim 1 in which said reinforcing band means is comprised of a substantially rigid nonstretchable material sized for an interference fit over the outer periphery of said neck portion.

5. The container of claim 1 in which said reinforcing band means is comprised of a heat shrinkable material which will serve to impart a degree of compression to said neck portion when applied thereto.

6. The container in claim 1 in which said reinforcing band means is comprised of a resiliently extensible ring which may be expanded by hand and thereafter disposed over said neck portion, whereafter said ring retracts resiliently to impart a degree of compression to said neck portion.

7. The container in claim 1 in which said closure means is provided with a reinforcing ring means to prevent collapsation of said closure means upon application of said reinforcing band means about said neck portion of said container body.

References Cited

UNITED STATES PATENTS

| 1,692,969 | 11/1938 | Van Voorhis | 150—8 |
| 1,986,256 | 1/1935 | Ellis | 150—52 |
| 2,595,877 | 5/1952 | Otano | 150—8 |
| 2,607,383 | 8/1952 | Christophersen | 150—8 |
| 2,622,598 | 12/1952 | Rosenblum | 128—272 |
| 2,693,189 | 11/1954 | Ryan | 128—272 |
| 2,783,908 | 3/1957 | Winfield | 215—37 |
| 3,325,031 | 6/1967 | Singier | 150—.5 X |

FOREIGN PATENTS

| 1,372,589 | 8/1964 | France. |

OTHER REFERENCES

The Bulletin of the Dow Corning Center for Aid to Medical Research vol. 3, No. 3, pp. 9 to 12, July 1961, 128—Silicon Digest.

The Bulletin of the Dow Corning Center for Aid to Medical Research vol. 4, No. 2, pp. 5 to 8, April 1962, 128—Silicon Digest.

The Bulletin of the Dow Corning Center for Aid to Medical Research vol. 6, No. 1, pp. 1 to 4, January 1964, 128—Silicon Digest.

DONALD F. NORTON, *Primary Examiner.*

U.S. Cl. X.R.

128—272; 150—8